(12) United States Patent
Holcomb et al.

(10) Patent No.: US 12,358,728 B1
(45) Date of Patent: Jul. 15, 2025

(54) FLAT TOP CONVEYOR CHAIN

(71) Applicant: Ramsey Products Corporation, Belmont, NC (US)

(72) Inventors: David Brian Holcomb, Belmont, NC (US); Charles Stone Stalvey, Belmont, NC (US); Philippe Alex Rojzman, Belmont, NC (US)

(73) Assignee: Ramsey Products Corporation, Belmont, NC (US)

( * ) Notice: Subject to any disclaimer, the term of this patent is extended or adjusted under 35 U.S.C. 154(b) by 156 days.

(21) Appl. No.: 18/338,791

(22) Filed: Jun. 21, 2023

(51) Int. Cl.
*B65G 17/40* (2006.01)
*B65G 17/08* (2006.01)

(52) U.S. Cl.
CPC .............. *B65G 17/40* (2013.01); *B65G 17/08* (2013.01)

(58) Field of Classification Search
CPC ................................. B65G 17/40; B65G 17/08
See application file for complete search history.

(56) References Cited

U.S. PATENT DOCUMENTS

| | | | |
|---|---|---|---|
| 7,600,632 B2 | 10/2009 | Hall | |
| 7,802,675 B2 | 9/2010 | Hall | |
| 8,322,522 B2 | 12/2012 | Hall et al. | |
| 8,356,709 B2 | 1/2013 | Hall et al. | |
| 8,474,607 B2 * | 7/2013 | Hall | B65G 17/083 198/850 |
| 8,485,351 B2 | 7/2013 | Hall et al. | |
| 9,174,269 B2 | 11/2015 | Hall et al. | |
| 2002/0147065 A1 * | 10/2002 | Winkelmann | B65G 17/38 474/215 |

(Continued)

FOREIGN PATENT DOCUMENTS

| | | | | |
|---|---|---|---|---|
| DE | 4433557 C1 * | 12/1995 | ........... | B65G 17/086 |
| EP | 1043248 A2 * | 10/2000 | ............ | B65G 17/08 |

(Continued)

OTHER PUBLICATIONS

IPSearch History Jan. 17, 2025 UTC; InnovationQ+ ; https://iq.ip.com/discover/searchhistory?id=5818352 (Year: 2025).*

(Continued)

*Primary Examiner* — Gene O Crawford
*Assistant Examiner* — Abby A Jorgensen
(74) *Attorney, Agent, or Firm* — Shumaker, Loop & Kendrick, LLP; S. Alexander Long, Jr.; Brandon C. Trego

(57) ABSTRACT

A conveyor chain having a plurality of toothed links and a plurality of non-toothed links, where the toothed and non-toothed links each include a link body, each having two pin openings for receiving connecting pins adapted for being inserted into the pin openings with interconnecting links to join the links together to form a chain link conveyor. Both the toothed and the non-toothed links have a flat top surface, a first shoulder, and a second shoulder that are parallel with respect to each other and perpendicular to the flat top surface. The toothed links have two downward extending teeth that taper down from the shoulders. The non-toothed links have a flat bottom surface. The toothed links are arranged with abutting shoulders in a row and the non-toothed links are arranged with abutting shoulders in a row, which minimizes backbend of the conveyor chain.

11 Claims, 5 Drawing Sheets

(56) References Cited

U.S. PATENT DOCUMENTS

| | | | |
|---|---|---|---|
| 2010/0236901 A1* | 9/2010 | Marshall | B65G 17/08 198/851 |
| 2011/0226592 A1* | 9/2011 | Cutshall | F27D 99/00 198/851 |
| 2011/0226593 A1* | 9/2011 | Hall | B65G 15/30 198/853 |
| 2015/0224565 A1* | 8/2015 | Hall | B21L 9/065 59/16 |

FOREIGN PATENT DOCUMENTS

| | | | | |
|---|---|---|---|---|
| EP | 1241117 A1 | * | 9/2002 | B65G 17/08 |
| EP | 2319781 A1 | * | 5/2011 | B65G 17/08 |
| EP | 2505522 A1 | * | 10/2012 | B65G 17/08 |
| EP | 3184471 A1 | * | 6/2017 | |
| WO | WO-2013121261 A1 | * | 8/2013 | B65G 17/08 |

OTHER PUBLICATIONS

International Search Report issued on Oct. 1, 2024, in related International Application No. PCT/US2024/033037 (3 pages).

* cited by examiner

FLAT TOP CONVEYOR CHAIN

TECHNICAL FIELD

The present disclosure relates to multi-link conveyor chains. More particularly, the present disclosure relates to conveyor chains having round pins and chain links with a flat top that prevent backbend in the conveyor chain.

BACKGROUND

Most conveying chains include two link designs: conventional tooth shaped driving links and non-toothed guide links. In some instances, spacers may be used between the links to provide for greater air flow through the chain during operation. However, the additional spacing allows for debris and other matter to become lodged in between the links of the chain, causing premature wear. Additionally, prior versions of conveyor chains have allowed for backbend, which is not well suited for running the conveyor in reverse.

Therefore, improvements are needed in conveyor chains that limit the amount of backbend so that the conveyor is better suited for reversing. Improvements are also needed to help limit the amount of debris that can enter the conveyor so that the chain can stay clean, allowing it to last longer.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a flat top conveyor chain includes a first link, where the first link includes a first pin opening for receiving a first connecting pin and a second pin opening for receiving a second connecting pin. The flat top conveyor chain further includes a second link, wherein the second link includes a third pin opening for receiving the first connecting pin and a fourth pin opening receiving the second connecting pin, wherein the first connecting pin and the second connecting pin are each adapted for being inserted into the pin openings with interconnecting links to join the links together to form a chain link conveyor.

Example embodiments include a flat top conveyor chain having a plurality of toothed links, where each of the plurality of toothed links includes a first pin opening for receiving a first connecting pin and a second pin opening for receiving a second connecting pin. The flat top conveyor chain further includes a plurality of non-toothed links, where each of the plurality of non-toothed links includes a third pin opening for receiving the first connecting pin and a fourth pin opening for receiving the second connecting pin, where the first connecting pin and the second connecting pin are each adapted for being inserted into the pin openings with interconnecting links including the plurality of toothed links and the plurality of non-toothed links to join the links together to form a flat top conveyor chain.

According to at least one embodiment, a method of minimizing backbend in a conveyor chain including the steps of: (1) providing a plurality of toothed links; (2) providing a plurality of non-toothed links; and (3) providing a plurality of elongate link pins. Each of the plurality of toothed links includes a first opening and a second opening, a first shoulder and a second shoulder, where the first shoulder and the second shoulder are parallel with respect to one another. In example embodiments, the first shoulder of at least one of the plurality of toothed links abuts the second shoulder of at least one of the plurality of toothed links. Each of the plurality of non-toothed links includes a third opening and a fourth opening, a third shoulder and a fourth shoulder, where the third shoulder and the forth shoulder are parallel with respect to one another. The third shoulder of at least one of the plurality of non-toothed links abuts the fourth shoulder of at least one of the plurality of non-toothed links. The method further includes the steps of: (1) positioning the plurality of toothed links into a toothed link row; (2) positioning the plurality of non-toothed links into a non-toothed link row, where the non-toothed link row is offset from the toothed link row; and (3) manipulating the plurality of elongate link pins into the toothed and non-toothed link openings to retain the respective toothed links and non-toothed links in an interconnecting configuration to join the links together to form a chain link conveyor, where the shoulders of the toothed and non-toothed links minimize backbend of the chain link conveyor.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTION

Figure 1:
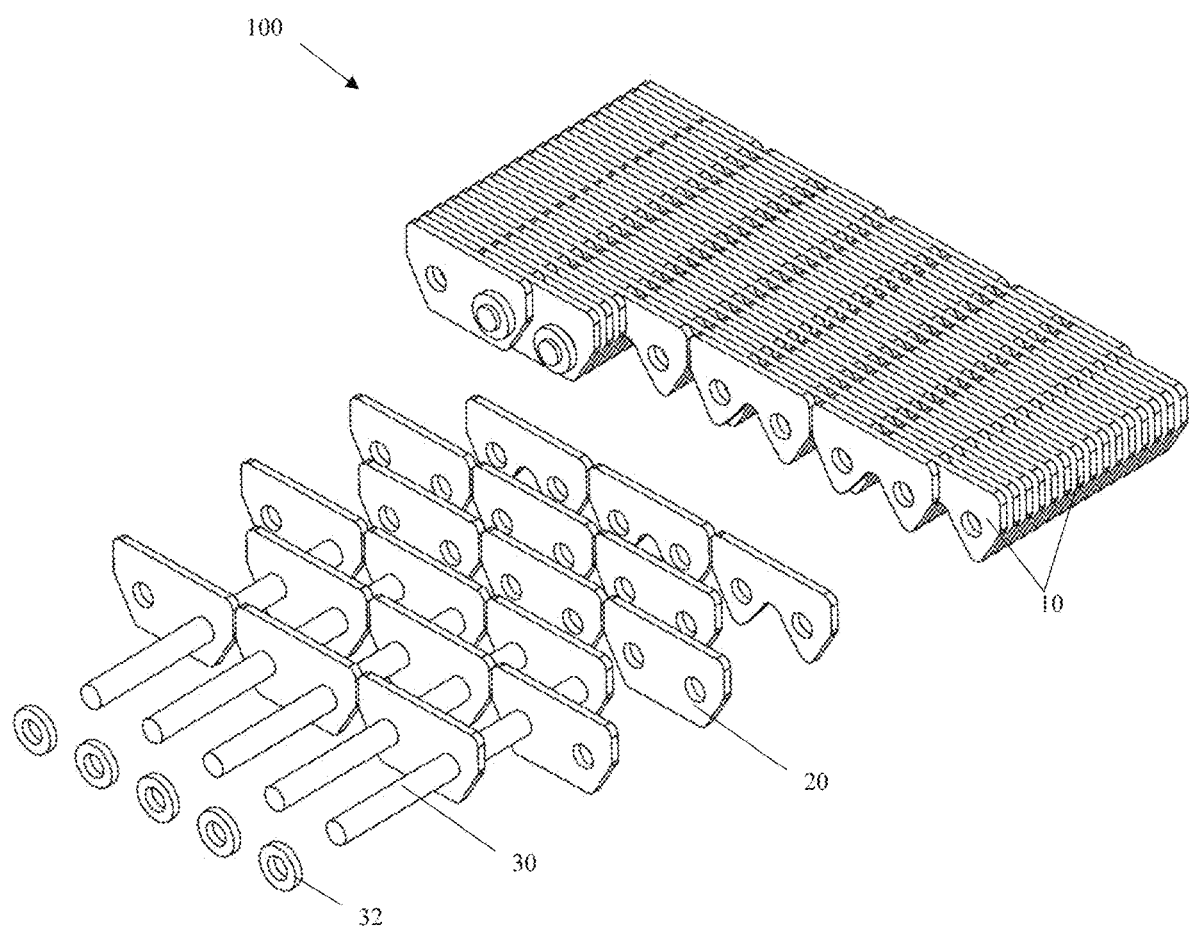
FIG. 1 is a perspective view of a length of conveyor chain according to an example embodiment of the invention.
Figure 2:
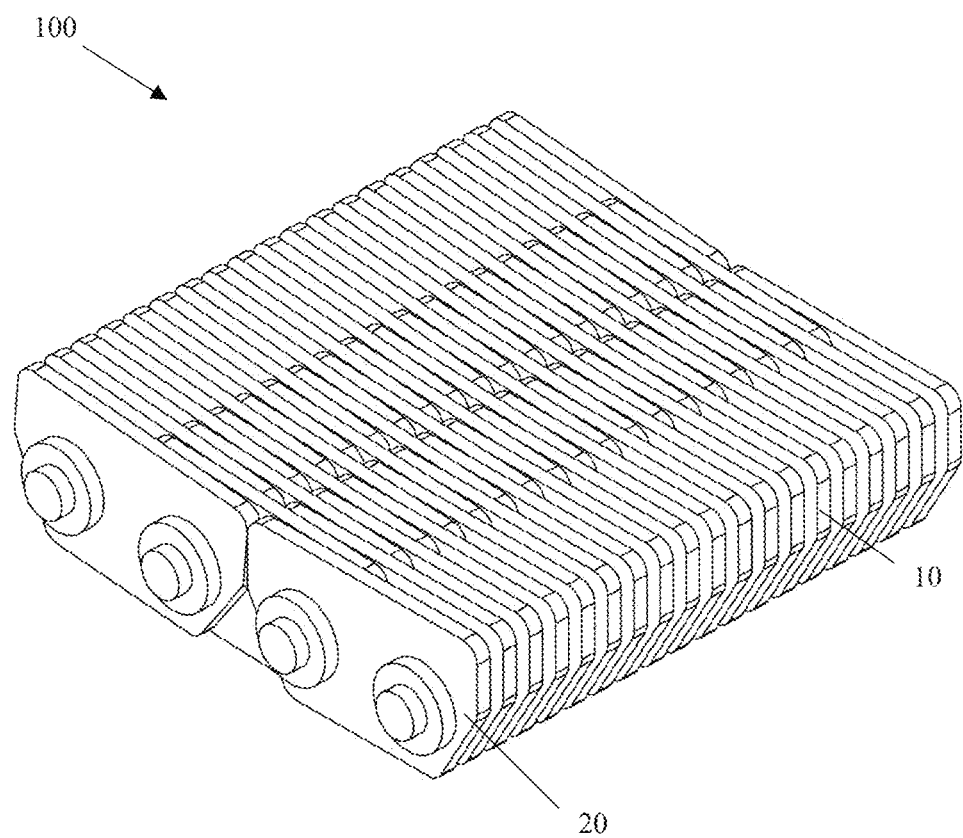
FIG. 2 is a perspective view of a length of conveyer chain of FIG. 1.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Unless indicated to the contrary, the numerical parameters set forth in the instant specification and attached claims are approximations that can vary depending upon the desired properties sought to be obtained within the scope of these descriptions.

Referring now to the drawings, FIGS. 1-5 depict a conveyor chain 100 having a plurality of toothed links 10, a plurality of flat bottom or non-toothed links 20, and a plurality of round link pins 30. The conveyor chain 100 is specially designed for conveying pallets, skids, and other objects through an assembly plant or warehouse. In example embodiments, the conveyor chain 100 is embedded into a recess in the floor at floor level to allow forklifts and other plant traffic to cross or drive over the conveyor. This placement, however, is susceptible to debris becoming lodged in between the links of the chain, causing premature wear. The present link shoulder design, described in more detail below, has smaller openings that prevent debris from damaging the conveyor chain 100. Additionally, the shape of the interconnected links allows the conveyor chain 100 to run in both a forward direction and in a reverse direction because the backbend is limited to approximately less than three degrees as compared to other conveyor chains having a much greater degree of backbend.

In addition, typical conveyor chains use a 2-pin design that requires lubrication, which attracts more dirt and debris. The present concept utilizes a single pin design that can run without lubrication, thereby preventing further damage to the conveyor chain 100. Further, because the current embodiment incorporates a single pin design, the conveyor chain 100 has a nearly 25% increase in capacity or strength over 2-pin designs, allowing for a longer life expectancy for the conveyor chain, meaning fewer parts and less cost in the long run.

Figure 3:
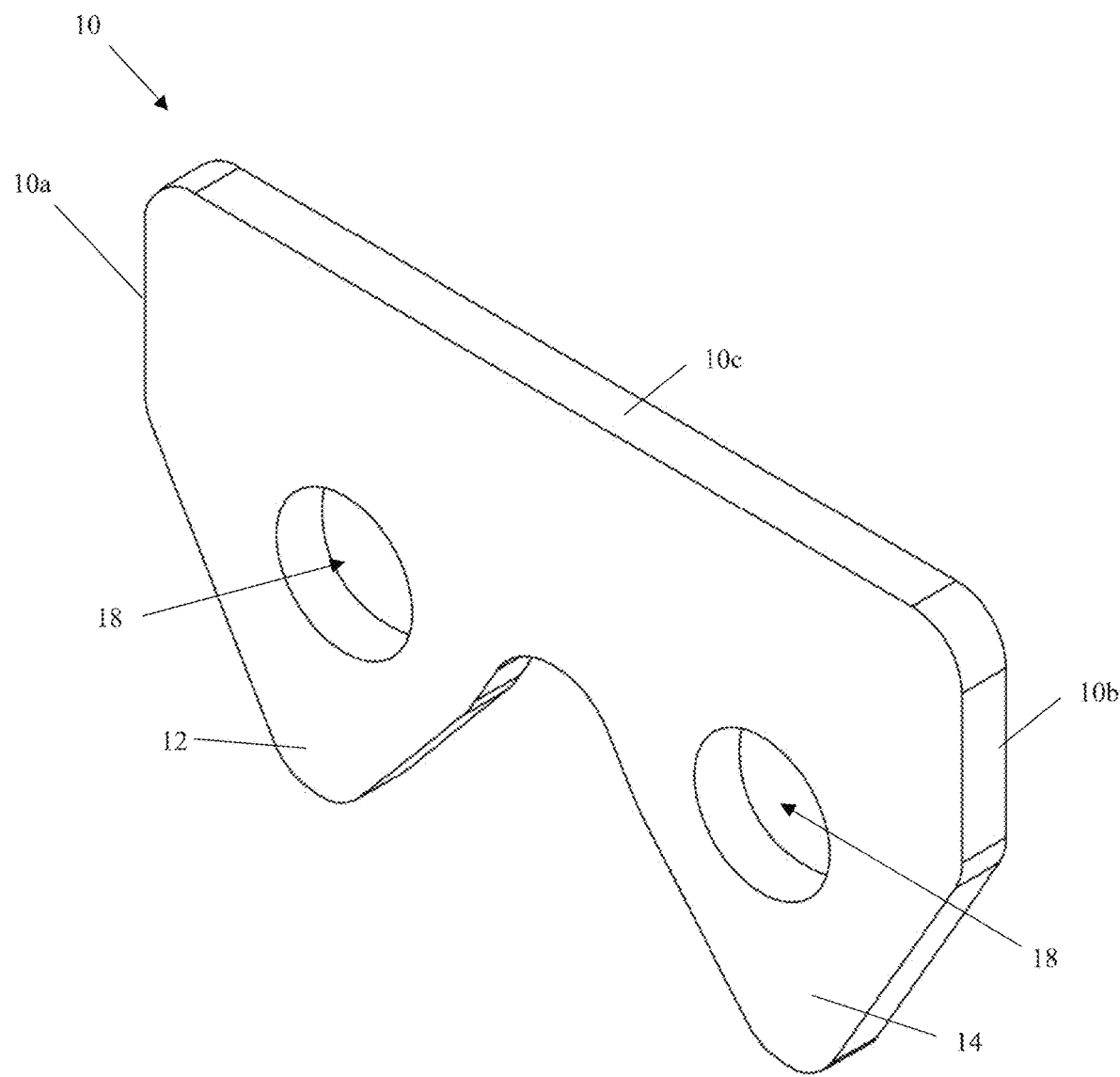
FIG. 3 is a perspective view of a first type of chain link of FIG. 1.

FIG. 3 illustrates a single toothed link 10. In prior embodiments, toothed links included generally rounded shoulders or sides that would allow for backbend of the chain. In the present embodiment, the toothed links 10 have parallel sides 10a, 10b that taper down into two downwardly extending driving teeth 12, 14, thereby limiting the backbend to less than three degrees. The driving teeth 12, 14, in some embodiments, are symmetrically identical, and in other embodiments, the driving teeth 12, 14 may be asymmetrical. In example embodiments, the toothed links have a substantially a flat top surface 10c. The toothed links 10 includes two openings or pin holes 18 that extend through the link from the front of the link to the rear of the link. The openings 18 are each shaped and sized for securely receiving a round link pin 30. Thus, the openings 18 are generally circular and only slightly larger than the circumference of the round link pins 30 in order to allow the link pin to pass through link. In example embodiments, the link pins 30 are inserted into the pin holes 18 with interconnecting links 10 joined together to form a portion of the chain link conveyor.

Figure 4:
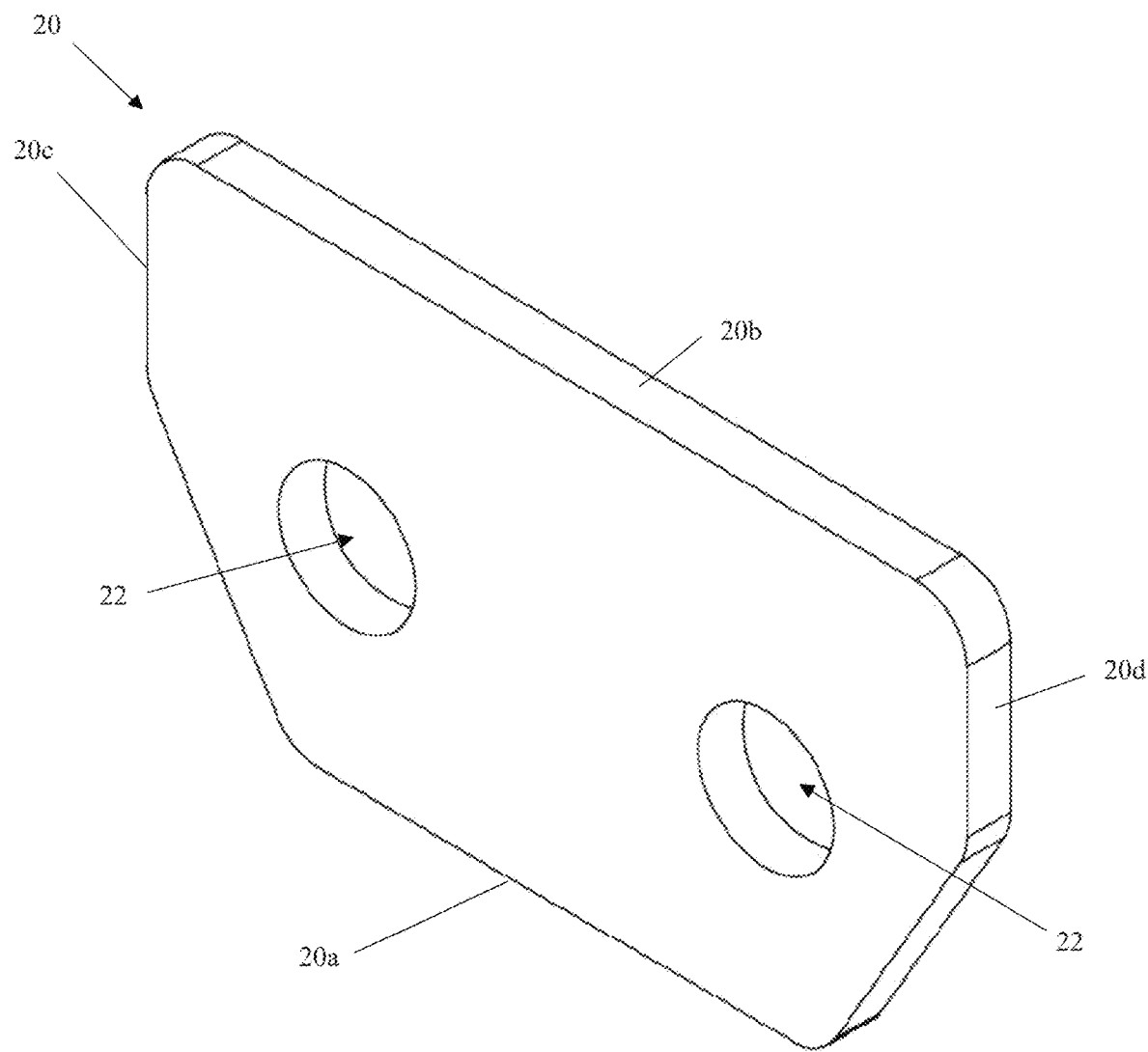
FIG. 4 is a perspective view of a second type of chain link of FIG. 1.

FIG. 4 illustrates a single non-toothed link 20, which has a substantially flat bottom surface 20a and a substantially flat top surface 20b. The overall outer perimeter of the non-toothed link 20 is essentially the same as the toothed links 10, except for the groove created between downwardly extending driving teeth 12, 14 of the toothed link. Thus, the non-toothed link 20 similarly has two sides or shoulders 20c, 20d that are generally parallel, which prevents backbend or backward rotation of the links 20 past approximately three degrees. Additionally, because the toothed link shoulders or sides 10a, 10b are substantially parallel and the non-toothed link shoulders 20c, 20d are substantially parallel, when assembled, the respective shoulders align creating tighter spacing between the links. This arrangement makes it more difficult for debris to enter the conveyor chain 100.

Referring still to FIG. 4, similar to the toothed link 10, the non-toothed links 20 also include two openings or pin access bores 22 that extend all the way through the link. The pin access bores 22 are generally the same size and shape as the toothed link openings 18 in order to allow the link pin 30 to pass through both the non-toothed link and the toothed link 20. Thus, the link pins 30 are inserted into the pin access bores 22 with interconnecting links 20 joined together to form a portion of the chain link conveyor. According to example embodiments, the links 10, 20 are generally the same width and thickness. In some embodiments, the width and thickness of the links 10, 20 may be different.

When assembling the chain 100, the link pins 30 are threaded through the respective interconnected links 10, 20 in the required sequence and arrangement on the laterally extending shaft of the pins. In the example embodiment, the link pins 30 are threaded through five (5) rows of interconnected non-toothed links 20, followed by thirty-two (32) rows of interconnected toothed links 10. However, this is only one of many arrangements that would be suitable. Once threaded through the links 10, 20, washers 32 are threaded onto the ends of the link pins 30. In example embodiments, the assembled chain 100 has a ¾" pitch and in some embodiments, the assembled chain 100 has a ½" pitch. However, any suitable pitch may be used.

Figure 5:
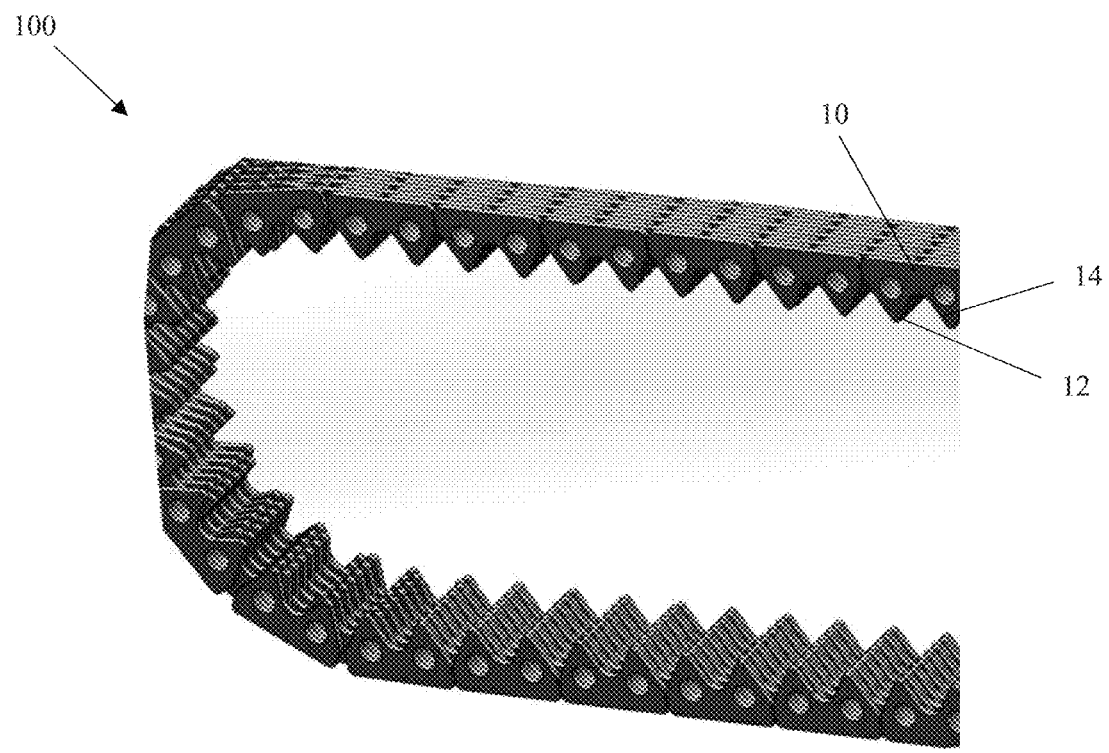
FIG. 5 is a perspective view of a length of conveyer chain of FIG. 1.

Referring to FIG. 5, the chain 100 is driven and guided by toothed sprockets (not shown) that receive and align with the teeth 12, 14 of the toothed links 10. The teeth 12, 14 allow the links 10 to wrap around the sprocket and engage with the sprocket teeth such that the chain 100 is driven and guided by the toothed sprockets.

In example embodiments, the toothed links 10 and the non-toothed links 20 are made from medium to low carbon steel. In particular embodiments, the links 10, 20 are made of many materials including steel, stainless steel, powdered metal, and plastic. In some embodiments, the links 10, 20 are fabricated from grades of steel that include stainless steel, chromium alloy, high manganese steel, sintered metals, and ceramics. In particular embodiments, the links 10, 20 are formed from materials with wear resistant coatings or that have been formed through heat-treatment such as case-hardening.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A flat top conveyor chain, comprising:
a plurality of toothed links, wherein each of the plurality of toothed links comprises;
a first pin opening for receiving a first connecting pin and a second pin opening for receiving a second connecting pin;
a first shoulder and a second shoulder, the first shoulder and the second shoulder being parallel with respect to one another, wherein a first shoulder of at least one of the plurality of toothed links abuts a second shoulder of at least one of the plurality of toothed links;
a plurality of non-toothed links, wherein each of the plurality of non-toothed links comprises a third pin opening for receiving the first connecting pin and a fourth pin opening receiving the second connecting pin,
wherein the first connecting pin and the second connecting pin are each adapted for being inserted into the pin openings with interconnecting links comprising the plurality of toothed links and the plurality of non-toothed links to join the links together to form a flat top conveyor chain.

2. The flat top conveyor chain of claim 1, wherein the plurality of toothed links comprises a row of toothed links.

3. The flat top conveyor chain of claim 1, wherein the plurality of non-toothed links comprise a row of non-toothed links.

4. The flat top conveyor chain of claim 1, wherein the conveyor chain comprises one or more rows of toothed links proximate one or more rows of non-toothed links, wherein at least one row of toothed links is offset from at least one row of non-toothed links.

5. The flat top conveyor chain of claim 1, wherein the plurality of toothed links and the plurality of non-toothed links have generally the same upper perimeter configuration.

6. The flat top conveyor chain of claim 1, wherein the flat top conveyor chain comprises a pitch between approximately ½ inch and ¾ inch.

7. A method of minimizing backbend in a conveyor chain, comprising the steps of:
providing a plurality of toothed links,
wherein each of the plurality of toothed links comprises a first opening and a second opening,
wherein each of the plurality of toothed links comprises a first shoulder and a second shoulder,
wherein the first shoulder and the second shoulder are parallel with respect to one another, and
wherein the first shoulder of at least one of the plurality of toothed links abuts the second shoulder of at least one of the plurality of toothed links;
providing a plurality of non-toothed links,
wherein each of the plurality of non-toothed links comprises a third opening and a fourth opening,
wherein each of the plurality of non-toothed links comprises a third shoulder and a fourth shoulder,
wherein the third shoulder and the fourth shoulder are parallel with respect to one another, and
wherein the third shoulder of at least one of the plurality of non-toothed links abuts the fourth shoulder of at least one of the plurality of non-toothed links;
providing a plurality of elongate link pins;
positioning the plurality of toothed links into a toothed link row;
positioning the plurality of non-toothed links into a non-toothed link row, wherein the non-toothed link row is offset from the toothed link row;
manipulating the plurality of elongate link pins into the toothed and non-toothed link openings to retain the respective toothed links and non-toothed links in an interconnecting configuration to join the links together to form a chain link conveyor, wherein the shoulders of the toothed and non-toothed links minimize backbend of the chain link conveyor.

8. The method of claim 7, wherein:
each of the plurality of toothed links and each of the plurality of non-toothed links comprises a flat top surface.

9. The method of claim 7, wherein:
each of the plurality of toothed links comprises a front surface and a back surface; and
each of the plurality of non-toothed links comprises an outer surface and an inner surface, wherein the method further comprises:
positioning the plurality of toothed links proximate the plurality of non-toothed links, wherein the front surface of the plurality of toothed links are positioned proximate the inner surface of the non-toothed links.

10. The method of claim 7, wherein the toothed link row comprises a plurality of toothed link rows between approximately 25 rows and 35 rows.

11. The method of claim 7, wherein the non-toothed link row comprises a plurality of non-toothed link rows between approximately three rows and 10 rows.

* * * * *